US011627534B2

United States Patent
Zhou et al.

(10) Patent No.: US 11,627,534 B2
(45) Date of Patent: Apr. 11, 2023

(54) PATHLOSS REFERENCE SIGNAL IDENTIFICATION

(71) Applicant: QUALCOMM Incorporated, San Diego, CA (US)

(72) Inventors: Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/168,497

(22) Filed: Feb. 5, 2021

(65) Prior Publication Data

US 2021/0266845 A1 Aug. 26, 2021

Related U.S. Application Data

(60) Provisional application No. 62/982,707, filed on Feb. 27, 2020, provisional application No. 62/980,847, filed on Feb. 24, 2020.

(51) Int. Cl.
*H04W 52/10* (2009.01)
*H04W 52/24* (2009.01)
(Continued)

(52) U.S. Cl.
CPC ........ *H04W 52/242* (2013.01); *H04B 7/0626* (2013.01); *H04W 52/325* (2013.01); *H04W 56/001* (2013.01); *H04W 80/02* (2013.01)

(58) Field of Classification Search
CPC ..... H04W 52/10; H04W 16/28; H04W 48/12; H04W 52/58; H04W 52/04; H04W 52/18;
(Continued)

(56) References Cited

U.S. PATENT DOCUMENTS

| 2019/0349867 | A1 | 11/2019 | Molavianjazi et al. |
| 2021/0029650 | A1* | 1/2021 | Cirik ................. H04W 52/0212 |
| 2022/0022141 | A1* | 1/2022 | Cirik ................. H04W 72/1289 |

FOREIGN PATENT DOCUMENTS

WO    WO-2011115421 A2    9/2011

OTHER PUBLICATIONS

Ericsson: "On the Timing for Pathloss RS Activation", 3GPP Draft, 3GPP TSG-RAN WG1 Meeting #100-e, R1-2001079, 3rd Generation Partnership Project (3GPP), Mobile Competence Centre, 650, Route Des Lucioles, F-06921 Sophia-Antipolis Cedex, France, vol. RAN WG1. No. e-Meeting, Feb. 24, 2020-Mar. 6, 2020, Feb. 14, 2020 (Feb. 14, 2020), XP051853162, 4 Pages, Retrieved from the Internet: URL: https://ftp.3gpp.org/tsg_ran/WG1_RL1/TSGR1_100_e/Docs/R1-2001079.zip. R1-2001079 On the Timing for pathloss RS activation.docx [retrieved on Feb. 14, 2020] paragraph 1.

(Continued)

*Primary Examiner* — Tu X Nguyen
(74) *Attorney, Agent, or Firm* — Harrity & Harrity, LLP

(57) ABSTRACT

Various aspects of the present disclosure generally relate to wireless communication. In some aspects, a user equipment (UE) may identify one or more pathloss reference signals based at least in part on whether a configuration, that indicates a set of pathloss reference signals, has been received and based at least in part on whether a pathloss reference signal activation command has been received; and estimate pathloss using the one or more pathloss reference signals. Numerous other aspects are provided.

30 Claims, 6 Drawing Sheets

(51) Int. Cl.
*H04W 52/32* (2009.01)
*H04B 7/06* (2006.01)
*H04W 80/02* (2009.01)
*H04W 56/00* (2009.01)

(58) Field of Classification Search
CPC ... H04W 52/06; H04B 7/0413; H04B 10/564; H04B 17/318
See application file for complete search history.

(56) References Cited

OTHER PUBLICATIONS

International Search Report and Written Opinion—PCT/US2021/017017—ISA/EPO—dated May 28, 2021.
Nokia, et al., "On the CSI Timing Relationships", 3GPP Draft, 3GPP TSG RAN1-NR#2 Ad Hoc, R1-1711301, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051300495, 4 Pages, Retrieved from the Internet: URL: http://www.3gpp.org/ftp/Meetings_3GPP_SYNC/RAN1/Docs/. [retrieved on Jun. 26, 2017] paragraph 3.
Qualcomm: "CR on Timing for MAC CE Applicability for HARQ-ACK on PUSCH", 3GPP Draft, 3GPP TSG RAN WG1 Meeting #98, R1-190XXXX, Draft, CR-4. 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Sep. 3, 2019 (Sep. 3, 2019), XP051766125, 4 Pages, Retrieved from the Internet: URL: http://www.3gpp.org/ftp/tsg_ran/WG1_RL1/TSGR1_98/Docs/R1-1909522.zip. [retrieved on Sep. 3, 2019] paragraph 7.2.1.
Qualcomm Incorporated: "Enhancements on Multi-Beam Operation", 3GPP Draft, 3GPP TSG RAN WG1 Meeting #100-e, R1-2000975, 3rd Generation Partnership Project (3GPP), Mobile Competence Centre, 650, Route Des Lucioles, F-06921 Sophia-Antipolis Cedex, France, vol. RAN WG1, No. Feb. 24, 2020-Mar. 6, 2020, Feb. 15, 2020 (Feb. 15, 2020), XP051853548, 3 Pages, Retrieved from the Internet: URL: https://ftp.3gpp.org/tsg_ran/WG1_RL1/TSGR1_100_e/Docs/R1-2000975.zip R1-2000975 Enhancements on Multi-beam Operation.docx [retrieved on Feb. 15, 2020] 3. Activation Time for Pathloss RS, the whole document.

\* cited by examiner

PATHLOSS REFERENCE SIGNAL IDENTIFICATION

CROSS-REFERENCE TO RELATED APPLICATION

This patent application claims priority to U.S. Provisional Patent Application No. 62/980,847, filed on Feb. 24, 2020, entitled "PATHLOSS REFERENCE SIGNAL IDENTIFICATION," and assigned to the assignee hereof. This patent application also claims priority to U.S. Provisional Patent Application No. 62/982,707, filed on Feb. 27, 2020, entitled "PATHLOSS REFERENCE SIGNAL IDENTIFICATION," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for pathloss reference signal identification.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying one or more pathloss reference signals based at least in part on whether a configuration, that indicates a set of pathloss reference signals, has been received and based at least in part on whether a pathloss reference signal activation command has been received; and estimating pathloss using the one or more pathloss reference signals.

In some aspects, a method of wireless communication, performed by a UE, may include identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; and estimating pathloss using the one or more pathloss reference signals.

In some aspects, a UE for wireless communication may include a memory and one or more processors operatively coupled to the memory. The memory and the one or more processors may be configured to identify one or more pathloss reference signals based at least in part on whether a configuration, that indicates a set of pathloss reference signals, has been received and based at least in part on whether a pathloss reference signal activation command has been received; and estimate pathloss using the one or more pathloss reference signals.

In some aspects, a UE for wireless communication may include a memory and one or more processors operatively coupled to the memory. The memory and the one or more processors may be configured to identify one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; and estimate pathloss using the one or more pathloss reference signals.

In some aspects, a non-transitory computer-readable medium may store one or more instructions for wireless communication. The one or more instructions, when executed by one or more processors of a UE, may cause the one or more processors to identify one or more pathloss reference signals based at least in part on whether a configuration, that indicates a set of pathloss reference signals, has been received and based at least in part on whether a pathloss reference signal activation command has been received; and estimate pathloss using the one or more pathloss reference signals.

In some aspects, a non-transitory computer-readable medium may store one or more instructions for wireless communication. The one or more instructions, when executed by one or more processors of a UE, may cause the one or more processors to identify one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; and estimate pathloss using the one or more pathloss reference signals.

In some aspects, an apparatus for wireless communication may include means for identifying one or more pathloss reference signals based at least in part on whether a configuration, that indicates a set of pathloss reference signals, has been received and based at least in part on whether a pathloss reference signal activation command has been received; and means for estimating pathloss using the one or more pathloss reference signals.

In some aspects, an apparatus for wireless communication may include means for identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; and means for estimating pathloss using the one or more pathloss reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
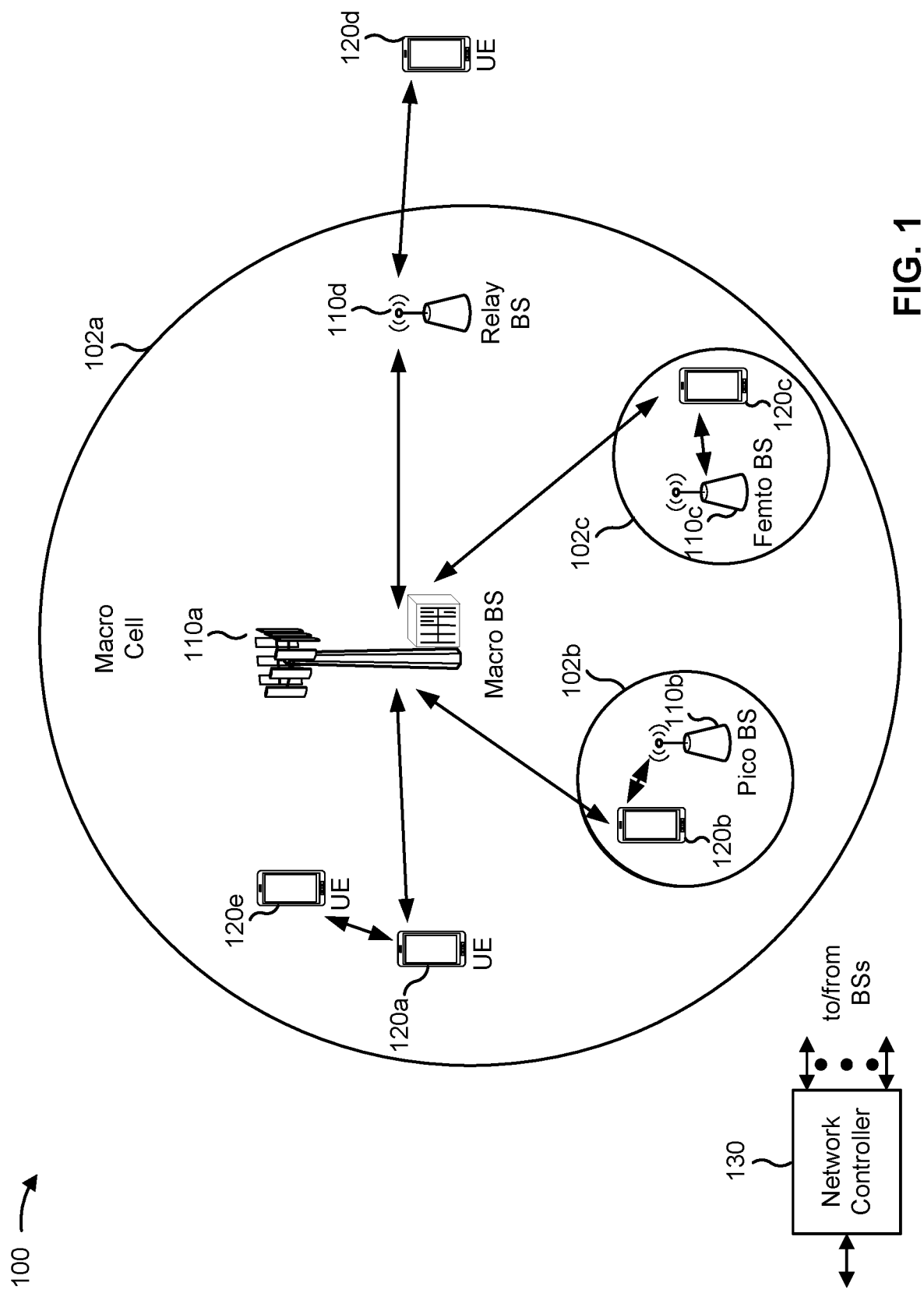
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
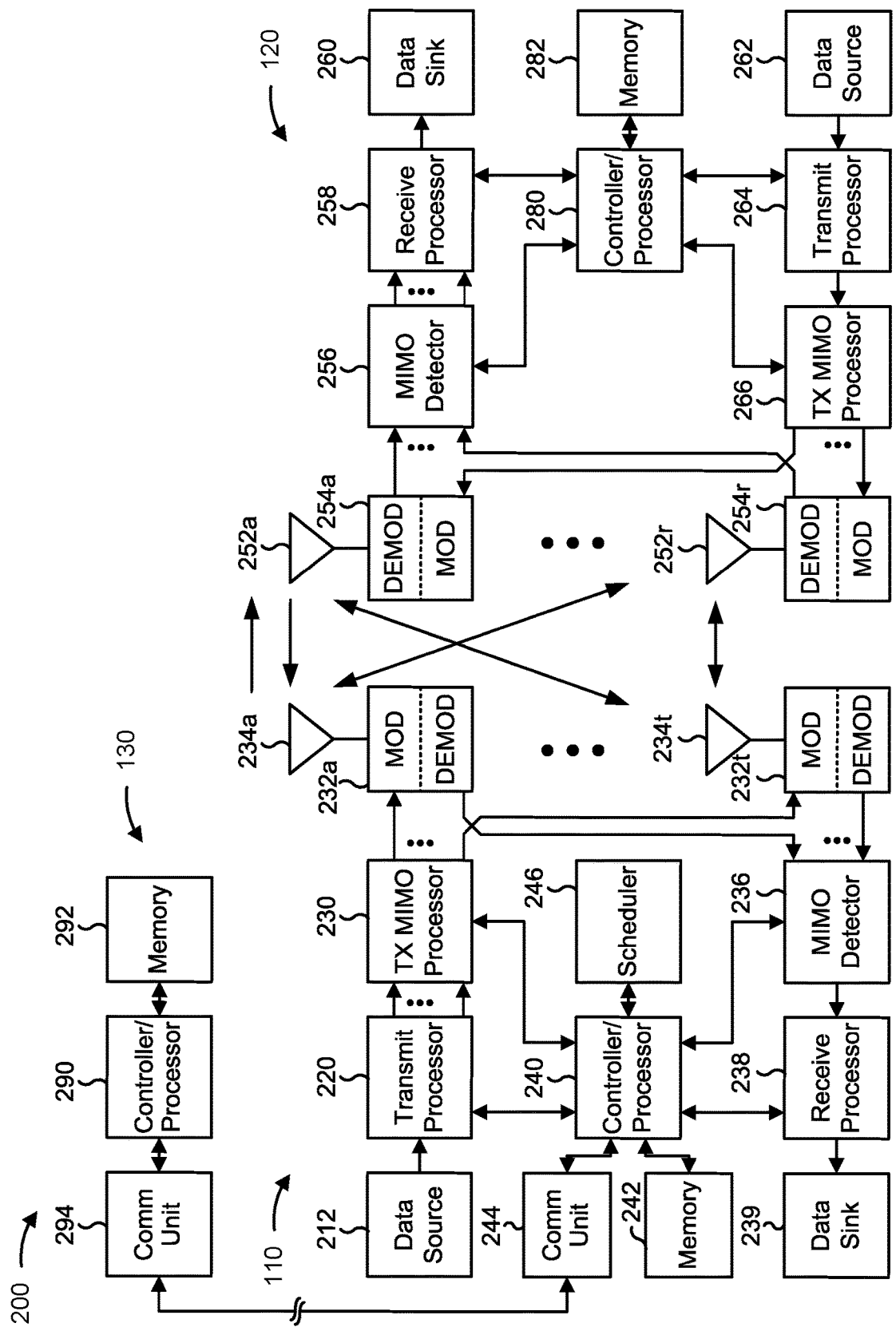
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs.

Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with pathloss reference signal identification, as described in more detail elsewhere herein. For example, controller/processor 240 of base station 110, controller/processor 280 of UE 120, and/or any other component(s) of FIG. 2 may perform or direct operations of, for example, process 300 of FIG. 3, process 400 of FIG. 4, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 300 of FIG. 3, process 400 of FIG. 4, and/or other processes as described herein. A scheduler 246 may schedule UEs for data transmission on the downlink and/or uplink.

In some aspects, UE 120 may include means for identifying one or more pathloss reference signals based at least in part on whether a configuration, that indicates a set of pathloss reference signals, has been received and based at least in part on whether a pathloss reference signal activation command has been received; means for estimating pathloss using the one or more pathloss reference signals; and/or the like. Additionally, or alternatively, the UE 120 may include means for identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; means for estimating pathloss using the one or more pathloss reference signals; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some scenarios, quasi co-location (QCL) information (e.g., a QCL property) and/or a QCL type may depend on or be a function of other information. A QCL property may include, for example, a Doppler shift, a Doppler spread, an average delay, a delay spread, or spatial receive parameters, among other examples. For example, one or more QCL types indicated to a UE can be based on a higher layer parameter QCL-Type and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, or

QCL-TypeD: {Spatial Rx parameter}.

A UE may use spatial QCL assumptions (e.g., spatial receive parameters of QCL-TypeD) to select an analog or digital receive (Rx) beam (e.g., during a beam management procedure). For example, a synchronization signal block (SSB) resource indicator (SSBRI or SRI) may indicate that a same beam used for a previous reference signal should be used for a subsequent communication.

A UE may identify an initial control resource set (CORESET) (e.g., having CORESET ID 0 or simply CORESET #0) in NR during an initial procedure (e.g., via a field in a master information block (MIB)). A ControlResourceSet information element (CORESET IE) sent via radio resource control (RRC) signaling (e.g., included in an RRC message) may convey information regarding a CORESET configured for a UE. The CORESET IE generally includes a CORESET identifier (ID), an indication of frequency domain resources (e.g., a number of RBs) assigned to the CORESET, contiguous time duration of the CORESET in a number of symbols, and Transmission Configuration Indicator (TCI) states.

A TCI state may indicate a directionality or a characteristic of a downlink beam, such as one or more QCL properties of the downlink beam. As noted above, a subset of the TCI states indicate QCL relationships between DL reference signals (RSs) in one reference signal (RS) set (e.g., TCI-Set) and physical downlink control channel (PDCCH) demodulation reference signal (DMRS) ports. A particular TCI state for a given UE (e.g., for unicast PDCCH) may be conveyed to the UE by a Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the Search Space IE is another RRC IE that defines resources where the UE is to search for PDCCH candidates for a given CORESET. Each search space is associated with one CORESET. The Search Space IE identifies a search space configured for a CORESET using a search space ID. In an aspect, the search space ID associated with CORESET #0 is Search Space ID #0. The search space is generally configured via a physical broadcast channel (PBCH) (e.g., in a MIB).

In many cases, it is important for a UE to know which assumptions the UE can make on a channel corresponding to different transmissions. For example, the UE may need to know which reference signals the UE can use to estimate the channel in order to decode a transmitted signal or communication (e.g., a PDCCH communication or a physical downlink shared channel (PDSCH) communication). It may also be important for the UE to be able to report relevant channel state information (CSI) to a base station for scheduling, link adaptation, and/or beam management purposes. In NR, the concept of QCL and TCI states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCLed" or "QCL'd") if a receiver (e.g., a UE) can apply channel properties determined by detecting a first reference signal to help detect a second reference signal. TCI states generally include configurations such as QCL relationships, for example, between the DL RSs in one channel state information reference signal (CSI-RS) set and the PDSCH DMRS ports.

In some cases, a UE may be configured with up to M TCI-States. Configuration of the M TCI-States can be via higher layer signalling, while a UE may be signalled to decode a PDSCH according to a detected PDCCH with downlink control information (DCI) indicating one of the TCI states. Each configured TCI state may include one RS set TCI-RS-SetConfig that indicates different QCL assumptions between certain source and target signals.

A UE may measure one or more downlink reference signals, received from a base station, to estimate pathloss between the UE and the base station. Pathloss indicates a reduction in power density of a signal as the signal propagates between wireless communication devices (e.g., a UE and a base station). For example, the base station may transmit a downlink reference signal with a transmit power that is known by the UE (e.g., due to an indication from the base station or due to a fixed transmit power). The UE may decode the downlink reference signal and measure a receive power that represents a power level at which the downlink reference signal is received by the UE. The UE may compare the transmit power (e.g., a reference signal transmit power) and the receive power (e.g., RSRP) to determine the pathloss. This is one example of estimating pathloss from a downlink reference signal, and the UE may estimate pathloss in another manner.

In some cases, a base station may configure (e.g., using a radio resource control (RRC) message) a set of pathloss reference signals, sometimes referred to as a pathloss reference signal pool. In some cases, the base station may instruct the UE to use one or more pathloss reference signals, of the configured set of pathloss reference signals, using a command (e.g., a signal, a message, and/or the like). For example, the base station may activate one or more pathloss reference signals, of the configured set of pathloss reference signals, by transmitting a pathloss reference signal activation command to the UE. In some cases, the pathloss reference signal activation command may be included in a medium access control (MAC) control element (CE) (collectively, MAC-CE). Upon receiving a MAC-CE that indicates one or more pathloss reference signals that are to be activated, the UE may measure those one or more activated pathloss reference signals and/or may use those one or more activated pathloss reference signals to estimate pathloss between the UE and the base station.

In addition to the activated pathloss reference signals for measuring and/or estimating pathloss, the UE may use one or more default pathloss reference signals, if any. The default pathloss reference signals for sounding reference signals (SRSs), physical uplink control channel (PUCCH) communications, and physical uplink shared channel (PUSCH) communications scheduled by DCI format 0_0 may be enabled by a corresponding RRC flag such as: enableDefaultBeamPlForPUSCH0_0, for PUSCH scheduled by DCI format 0_0; enableDefaultBeamPlForPUCCH, for dedicated PUCCH; and/or enableDefaultBeamPlForSRS, for dedicated SRS.

If enabled, a default pathloss reference signal is QCLed (with one of QCL types A, B, C, or D) with reference signal QCL parameters or properties used for receiving the CORESET with the lowest ID in the active downlink bandwidth part (BWP) of the current component carrier (CC) of the UE. If no CORESETs are configured for the UE in the active downlink BWP, then the default pathloss reference signal is one QCL Type A, Type B, Type C, or Type D reference signal in the TCI state activated for PDSCH reception in the active DL BWP of the current CC of the UE. In some aspects, the default pathloss reference signals and the activated pathloss reference signals may be measured and/or used for estimation when a MAC-CE-based pathloss reference signal activation feature has been enabled (e.g., an RRC flag enablePLRSupdateForPUSCHSRS is set to true)

and the total number of configured pathloss reference signals satisfies a threshold (e.g., is greater than four). In some aspects, all configured pathloss reference signals and activated pathloss reference signals may be measured and/or used for estimation when the MAC-CE-based pathloss reference signal activation feature has been enabled and the total number of configured pathloss reference signals does not satisfy the threshold (e.g., is less than or equal to four).

However, in some cases, a UE may receive a configuration that indicates the set of pathloss reference signals, but may fail to receive a MAC-CE that activates one or more pathloss reference signals of the configured set of pathloss reference signals. For example, the base station may fail to transmit the MAC-CE, the UE may fail to receive and/or successfully decode the MAC-CE, and/or the like. In these cases, there may be ambiguity about which pathloss reference signal(s) that the UE should use to estimate pathloss. For example, the base station may expect the UE to use a first pathloss reference signal (or a first set of pathloss reference signals) to estimate pathloss, but the UE may use a second pathloss reference signal (or a second set of pathloss reference signals) to estimate pathloss. This may result in improper uplink transmit power determination (e.g., selection, calculation, and/or the like) by the UE, such as when pathloss is used to determine a transmit power for the UE. Determination of an improper uplink transmit power may result in failed uplink communications if the UE selects a transmit power that is lower than necessary, and may result in excess consumption of UE resources (e.g., battery power) if the UE selects a transmit power that is higher than necessary. Similar issues may arise if the UE has not received a configured set of pathloss reference signals (e.g., due to failure of an RRC message, due to the configuration failing to indicate the set of pathloss reference signals, and/or the like).

Some techniques and apparatuses described herein enable a UE and a base station to reduce ambiguity in pathloss reference signal selection. For example, some techniques and apparatuses described herein provide rules for a UE to follow in various scenarios (e.g., when a configured set of pathloss reference signals is or is not received, when an activation command is or is not received, and/or the like) to select one or more pathloss reference signals. In this way, the UE may properly determine an uplink transmit power, which may improve reliability of uplink communications, may reduce latency and conserve network resources due to fewer failed communications, may conserve UE battery power by reducing the likelihood of determining an uplink transmit power that is too high, and/or the like.

Furthermore, some techniques and apparatuses described herein conserve UE resources (e.g., processing resources, memory resources, battery power, and/or the like) by limiting a number of pathloss reference signals that are permitted to be configured when MAC-CE-based activation of pathloss reference signals is disabled. When MAC-CE-based activation of pathloss reference signals is disabled, configuring a large number (e.g., greater than a threshold number) of pathloss reference signals may result in the UE always measuring that large number of pathloss reference signals because a MAC-CE cannot be used to activate or deactivate pathloss reference signals. Thus, some techniques and apparatuses described herein conserve UE resources by setting a maximum number of pathloss reference signals that are permitted to be configured when MAC-CE-based activation of pathloss reference signals is disabled. These techniques and apparatuses may also improve flexibility in using pathloss reference signals by allowing more than the maximum number of pathloss reference signals to be configured when MAC-CE-based activation of pathloss reference signals is enabled.

Figure 3:
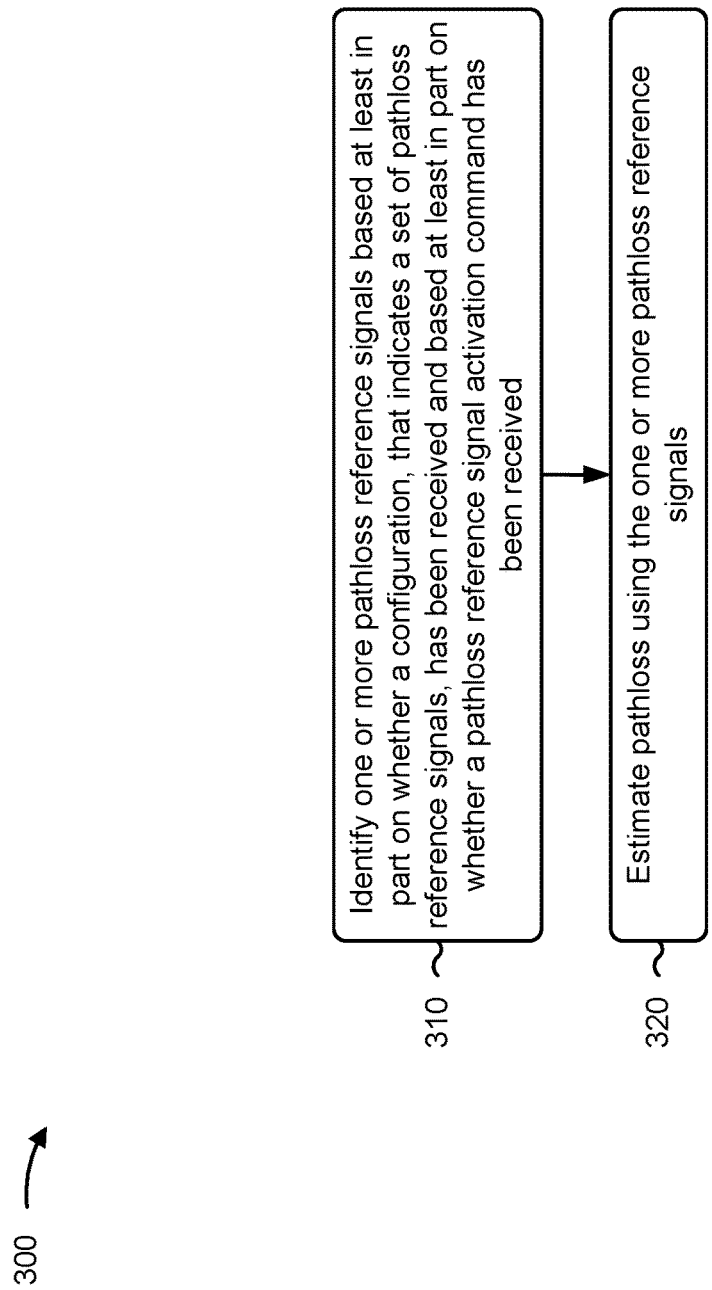
FIG. 3 is a diagram illustrating an example process performed, for example, by a user equipment, in accordance with various aspects of the present disclosure.

FIG. 3 is a diagram illustrating an example process 300 performed, for example, by a UE, in accordance with various aspects of the present disclosure. Example process 300 is an example where the UE (e.g., UE 120 and/or the like) performs operations associated with pathloss reference signal identification.

As shown in FIG. 3, in some aspects, process 300 may include identifying one or more pathloss reference signals based at least in part on whether a configuration, that indicates a set of pathloss reference signals, has been received and based at least in part on whether a pathloss reference signal activation command has been received (block 310). For example, the UE (e.g., using receive processor 258, transmit processor 264, controller/processor 280, memory 282, identification component 506 of FIG. 5, and/or the like) may identify one or more pathloss reference signals based at least in part on whether a configuration, that indicates a set of pathloss reference signals, has been received and based at least in part on whether a pathloss reference signal activation command has been received.

As further shown in FIG. 3, in some aspects, process 300 may include estimating pathloss using the one or more pathloss reference signals (block 320). For example, the UE (e.g., using receive processor 258, transmit processor 264, controller/processor 280, memory 282, estimation component 508 of FIG. 5, and/or the like) may estimate pathloss using the one or more pathloss reference signals.

Process 300 may include additional aspects, such as any single aspect or any combination of aspects described below and/or in connection with one or more other processes described elsewhere herein.

In a first aspect, the one or more pathloss reference signals are identified based at least in part on at least one of: whether pathloss reference signal activation commands are enabled, a number of configured pathloss reference signals, whether the number of configured pathloss reference signals satisfies a threshold, or a combination thereof.

In a second aspect, alone or in combination with the first aspect, the one or more pathloss reference signals are identified based at least in part on a determination that pathloss reference signal activation commands are enabled and the number of configured pathloss reference signals satisfies a threshold. In some aspects, the UE may determine that pathloss reference signal activation commands are enabled based at least ine part on a determination that the configuration (e.g., an RRC message) includes a specific information element (IE) or bit (e.g., an enablePLRSupdate-ForPUSCHSRS IE or bit) that is set to a specific value. For example, a first value of the IE or bit (e.g., zero) may indicate that pathloss reference signal activation commands are disabled, and a second value of the IE or bit (e.g., one) may indicate that pathloss reference signal activation commands are enabled. In some aspects, the threshold is equal to four.

In a third aspect, alone or in combination with one or more of the first and second aspects, the one or more pathloss reference signals are identified based at least in part on a determination that pathloss reference signal activation commands are enabled and the number of configured pathloss reference signals does not satisfy a threshold. In a fourth aspect, alone or in combination with one or more of the first through third aspects, the one or more pathloss reference signals are identified based at least in part on a determination that pathloss reference signal activation commands are disabled and the number of configured pathloss reference signals satisfies a threshold. In a fifth aspect, alone or in combination with one or more of the first through fourth aspects, the one or more pathloss reference signals are identified based at least in part on a determination that pathloss reference signal activation commands are disabled and the number of configured pathloss reference signals does not satisfy a threshold. In some aspects, the threshold is equal to four. In a sixth aspect, alone or in combination with one or more of the first through fifth aspects, the pathloss reference signal activation commands are MAC-CE commands.

In a seventh aspect, alone or in combination with one or more of the first through sixth aspects, the one or more pathloss reference signals are identified based at least in part on a determination that the configuration has been received and based at least in part on a determination that the pathloss reference signal activation command has been received. In an eighth aspect, alone or in combination with one or more of the first through seventh aspects, the one or more pathloss reference signals are indicated in the pathloss reference signal activation command. In a ninth aspect, alone or in combination with one or more of the first through eighth aspects, the one or more pathloss reference signals include the set of pathloss reference signals indicated in the configuration or a subset of the set of pathloss reference signals indicated in the configuration. For example, if the UE receives the configuration and the pathloss reference signal activation command, then the UE may use the pathloss reference signals indicated in the pathloss reference signal activation command to estimate pathloss.

In a tenth aspect, alone or in combination with one or more of the first through ninth aspects, the one or more pathloss reference signals are identified based at least in part on a determination that the configuration has been received and based at least in part on a determination that the pathloss reference signal activation command has not been received. In an eleventh aspect, alone or in combination with one or more of the first through tenth aspects, the one or more pathloss reference signals include a synchronization signal block used to obtain a master information block. In a twelfth aspect, alone or in combination with one or more of the first through eleventh aspects, the one or more pathloss reference signals include a subset of the set of pathloss reference signals. In a thirteenth aspect, alone or in combination with one or more of the first through twelfth aspects, the subset is identified based at least in part on a rule. In a fourteenth aspect, alone or in combination with one or more of the first through thirteenth aspects, the subset includes a specific number of pathloss reference signals (e.g., four pathloss reference signals).

In a fifteenth aspect, alone or in combination with one or more of the first through fourteenth aspects, the subset includes one of: a subset of pathloss reference signals, included in the set of pathloss reference signals, having highest reference signal identifiers among the set of pathloss reference signals; a subset of pathloss reference signals, included in the set of pathloss reference signals, having lowest reference signal identifiers among the set of pathloss reference signals; a subset of pathloss reference signals, included in the set of pathloss reference signals, having highest reference signal identifiers, in a serving cell, among the set of pathloss reference signals; a subset of pathloss reference signals, included in the set of pathloss reference signals, having lowest reference signal identifiers, in the serving cell, among the set of pathloss reference signals; a subset of pathloss reference signals, included in the set of pathloss reference signals, having highest reference signal identifiers, in an active bandwidth part of the serving cell, among the set of pathloss reference signals; or a subset of pathloss reference signals, included in the set of pathloss reference signals, having lowest reference signal identifiers, in an active bandwidth part of the serving cell, among the set of pathloss reference signals.

In a sixteenth aspect, alone or in combination with one or more of the first through fifteenth aspects, the one or more pathloss reference signals are indicated by a base station or are specified by a wireless communication standard. For example, the base station and/or the wireless communication standard may indicate that a specific CSI-RS (e.g., having a particular CSI-RS identifier, such as 10) is to be used for pathloss estimation if the UE has not received the configuration and/or has not received the pathloss reference signal activation command. In a seventeenth aspect, alone or in combination with one or more of the first through sixteenth aspects, the one or more pathloss reference signals are not included in the set of pathloss reference signals.

In an eighteenth aspect, alone or in combination with one or more of the first through seventeenth aspects, the one or more pathloss reference signals include a subset of pathloss reference signals, of the set of pathloss reference signals, that is indicated in the configuration. In a nineteenth aspect, alone or in combination with one or more of the first through eighteenth aspects, the subset of pathloss reference signals includes at least one of: a pathloss reference signal indicated in association with a physical uplink shared channel (PUSCH) power control configuration (e.g., for PUSCH power control, the UE may use a pathloss reference signal indicated in an SRI-PUSCH-PowerControl IE of the configuration), a pathloss reference signal indicated in association with an activated physical uplink control channel (PUCCH) spatial relation (e.g., for PUCCH power control, the UE may use a pathloss reference signal configured in association with a PUCCH spatial relation that is activated by a MAC-CE), a pathloss reference signal indicated in association with a sounding reference signal (SRS) resource set (e.g., for SRS power control, the UE may use a pathloss reference signal indicated in an SRS resource set for that SRS), or a combination thereof. In a twentieth aspect, alone or in combination with one or more of the first through nineteenth aspects, a number of pathloss reference signals, included in the subset of pathloss reference signals, is less than or equal to a threshold (e.g., four).

In a twenty-first aspect, alone or in combination with one or more of the first through twentieth aspects, the one or more pathloss reference signals are identified based at least in part on a determination that the configuration has not been received and based at least in part on a determination that the pathloss reference signal activation command has not been received. In a twenty-second aspect, alone or in combination with one or more of the first through twenty-first aspects, the one or more pathloss reference signals include a synchronization signal block used to obtain a master information block. In a twenty-third aspect, alone or in combination with one or more of the first through twenty-second aspects, the one or more pathloss reference signals are indicated by a base station or are specified by a wireless communication standard. For example, the base station and/or the wireless communication standard may indicate that a specific CSI-RS (e.g., having a particular CSI-RS identifier, such as 10) is to be used for pathloss estimation if the UE has not received the configuration and/or has not received the pathloss reference signal activation command.

In a twenty-fourth aspect, alone or in combination with one or more of the first through twenty-third aspects, the one or more pathloss reference signals are identified for a particular uplink channel or a particular uplink reference signal. For example, the one or more pathloss reference signals may be identified for a PUCCH (e.g., a PUCCH communication), a PUSCH (e.g., a PUSCH communication), a physical random access channel (PRACH) (e.g., a PRACH communication), an SRS, and/or the like. In a twenty-fifth aspect, alone or in combination with one or more of the first through twenty-fourth aspects, different uplink channels (e.g., PUCCH, PUSCH, PRACH, and/or the like) or different uplink reference signals (e.g., SRS) are associated with at least one of: different configurations that indicate corresponding sets of pathloss reference signals for a corresponding uplink channel or uplink reference signal, different pathloss reference signal activation commands, or a combination thereof.

In a twenty-sixth aspect, alone or in combination with one or more of the first through twenty-fifth aspects, the configuration and the pathloss reference signal activation command are specific to an uplink channel (e.g., PUCCH, PUSCH, PRACH, and/or the like), an uplink reference signal (e.g., SRS), a group of uplink channels (e.g., PUCCH, PUSCH, PRACH, and/or the like), a group of uplink reference signals (e.g., SRS in multiple SRS resource sets), or a group that includes at least one uplink channel and at least one uplink reference signal. In a twenty-seventh aspect, alone or in combination with one or more of the first through twenty-sixth aspects, the one or more pathloss reference signals are identified for all uplink channels and all uplink reference signals.

In a twenty-eighth aspect, alone or in combination with one or more of the first through twenty-seventh aspects, a number of pathloss reference signals, included in the set of pathloss reference signals, is based at least in part on whether pathloss reference signal activation commands are enabled or disabled. In a twenty-ninth aspect, alone or in combination with one or more of the first through twenty-eighth aspects, the number of pathloss reference signals is permitted to be greater than a threshold (e.g., four) if pathloss reference signal activation commands are enabled, and is not permitted to be greater than the threshold (e.g., four) if pathloss reference signal activation commands are disabled.

In a thirtieth aspect, alone or in combination with one or more of the first through twenty-ninth aspects, the configuration is included in a radio resource control message. In a thirty-first aspect, alone or in combination with one or more of the first through thirtieth aspects, the pathloss reference signal activation command is a MAC-CE message. In a thirty-second aspect, alone or in combination with one or more of the first through thirty-first aspects, the set of pathloss reference signals includes at least one channel state information reference signal (CSI-RS).

In a thirty-first aspect, alone or in combination with one or more of the first through thirtieth aspects, the one or more pathloss reference signals comprise one or more default pathloss reference signals.

Although FIG. 3 shows example blocks of process 300, in some aspects, process 300 may include additional blocks, fewer blocks, different blocks, or differently arranged blocks than those depicted in FIG. 3. Additionally, or alternatively, two or more of the blocks of process 300 may be performed in parallel.

Figure 4:
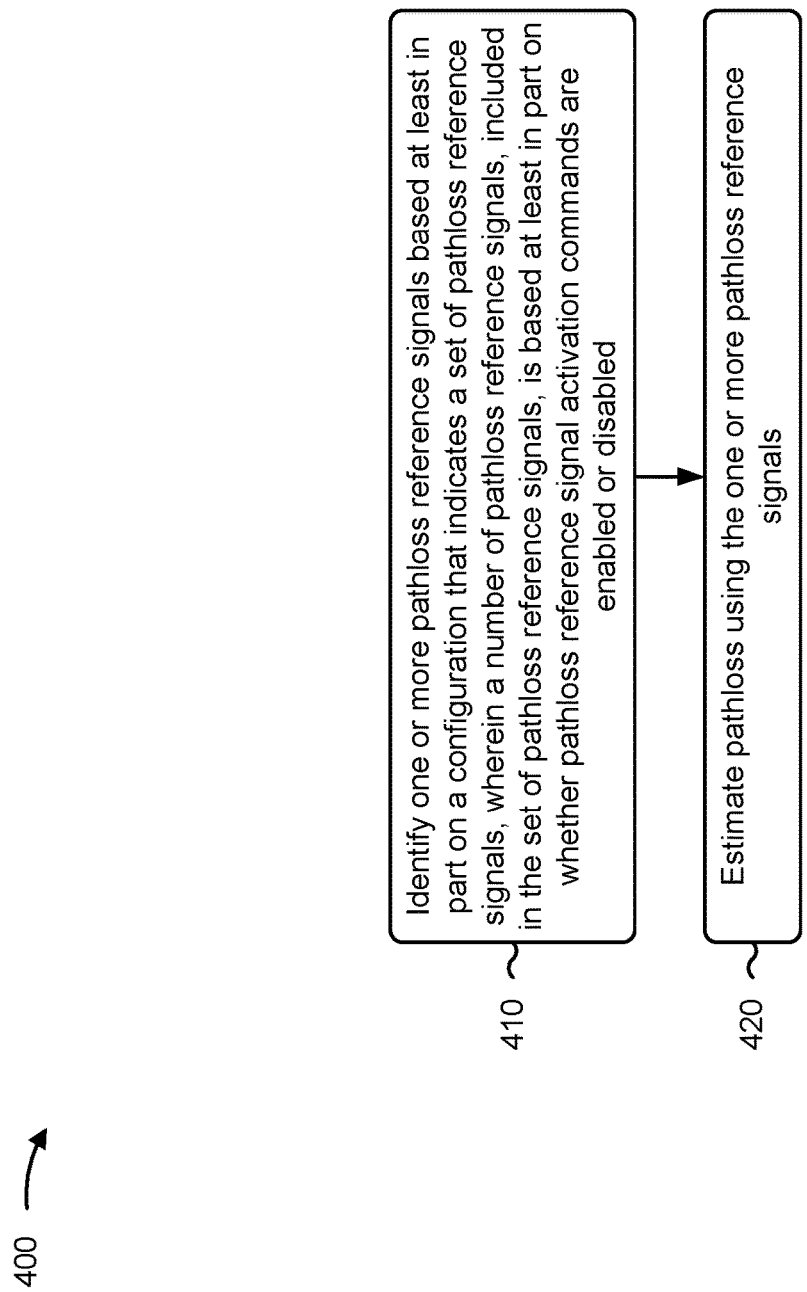
FIG. 4 is a diagram illustrating another example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with pathloss reference signal identification.

As shown in FIG. 4, in some aspects, process 400 may include identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled (block 410). For example, the UE (e.g., using receive processor 258, transmit processor 264, controller/processor 280, memory 282, identification component 506 of FIG. 5, and/or the like) may identify one or more pathloss reference signals based at least in part on a configuration that indicates a set of pathloss reference signals. In some aspects, a number of pathloss reference signals, included in the set of pathloss reference signals, is based at least in part on whether pathloss reference signal activation commands are enabled or disabled.

As further shown in FIG. 4, in some aspects, process 400 may include estimating pathloss using the one or more pathloss reference signals (block 420). For example, the UE (e.g., using receive processor 258, transmit processor 264, controller/processor 280, memory 282, estimation component 508 of FIG. 5, and/or the like) may estimate pathloss using the one or more pathloss reference signals.

Process 400 may include additional aspects, such as any single aspect or any combination of aspects described below and/or in connection with one or more other processes described elsewhere herein.

In a first aspect, the number of pathloss reference signals is permitted to be greater than a threshold if pathloss reference signal activation commands are enabled, and is not permitted to be greater than the threshold if pathloss reference signal activation commands are disabled.

In a second aspect, alone or in combination with the first aspect, the one or more pathloss reference signals comprise one or more default pathloss reference signals.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
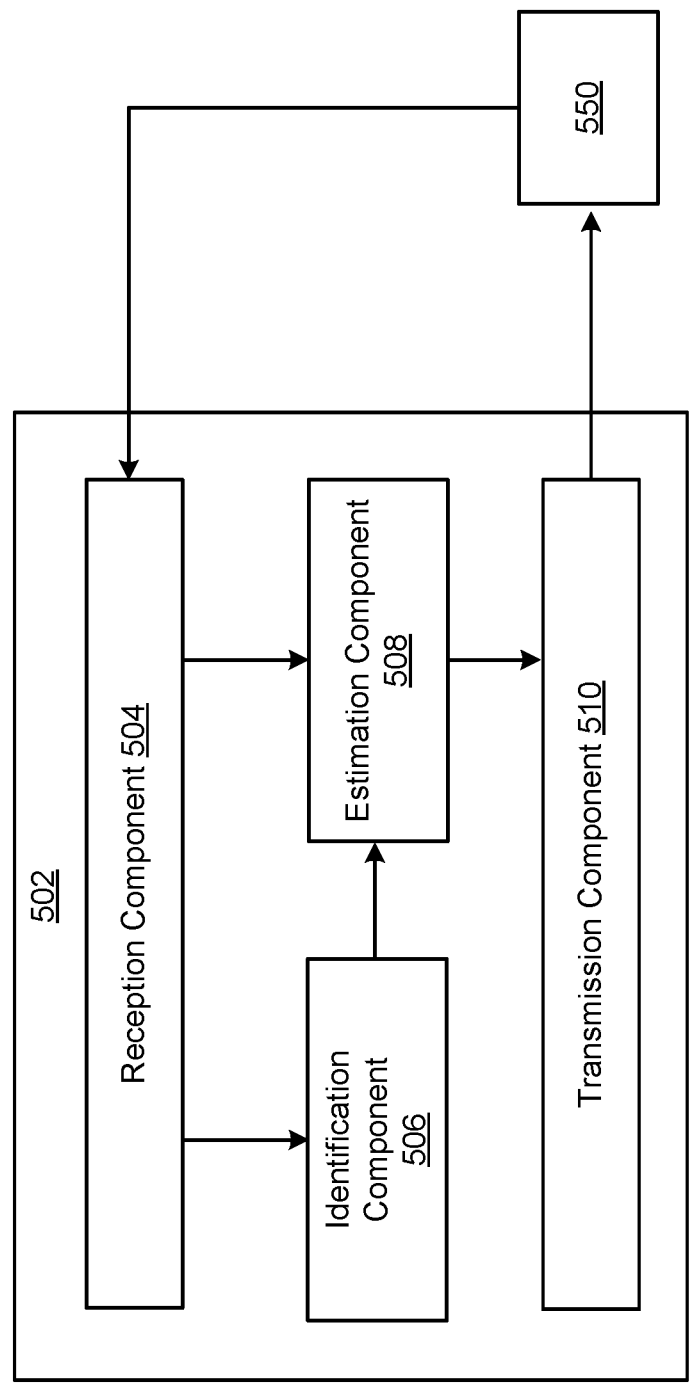
FIG. 5 is a data flow diagram illustrating an example of a data flow between different components in an example apparatus, in accordance with various aspects of the present disclosure.

FIG. 5 is a data flow diagram 500 illustrating a data flow between different components in an example apparatus 502. The apparatus 502 may be a UE. In some aspects, the apparatus 502 includes a reception component 504, an identification component 506, an estimation component 508, and/or a transmission component 510. As shown, the apparatus 502 may communicate with another apparatus 550 (e.g., a UE, a base station, or another wireless communication device) using the reception component 504 and/or the transmission component 510. As shown the apparatus 502 may communicate with an apparatus 550, such as a base station.

In some aspects, the identification component 506 may identify one or more pathloss reference signals based at least in part on whether a configuration, that indicates a set of pathloss reference signals, has been received and based at least in part on whether a pathloss reference signal activation command has been received. In some aspects, the identification component 506 may determine whether the configuration and/or the pathloss reference signal activation command has been received based at least in part on information received from the reception component 504. In some aspects, the reception component 504 may receive (or may not receive) the configuration from the apparatus 550 and/or may receive (or may not receive) the pathloss reference signal activation command from the apparatus 550. The reception component 504 may indicate, to the identification component 506, whether the configuration has been received and/or whether the pathloss reference signal activation command has been received. Additionally, or alternatively, the reception component 504 may provide the configuration and/or the pathloss reference signal activation command to the identification component 506. In some aspects, the identification component 506 may identify the one or more pathloss reference signals based at least in part on the configuration and/or based at least in part on the pathloss reference signal activation command.

The estimation component 508 may estimate pathloss using the one or more pathloss reference signals. For example, the identification component 506 may indicate the identified one or more pathloss reference signals to the estimation component 508. Additionally, or alternatively, the reception component 504 may provide received pathloss reference signals (e.g., from the configured set of pathloss reference signals) to the estimation component 508. The estimation component 508 may use the identified one or more pathloss reference signals to estimate pathloss. In some aspects, the estimation component 508 may indicate the estimated pathloss to the transmission component 510. In some aspects, the transmission component 510 may use the estimated pathloss to communicate with the apparatus 550, such as to determine a transmit power for a communication to be transmitted to the apparatus 550.

The apparatus may include additional components that perform each of the blocks of the algorithm in the aforementioned process 300 of FIG. 3, process 400 of FIG. 4, and/or the like. Each block in the aforementioned process 300 of FIG. 3, process 400 of FIG. 4, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6:
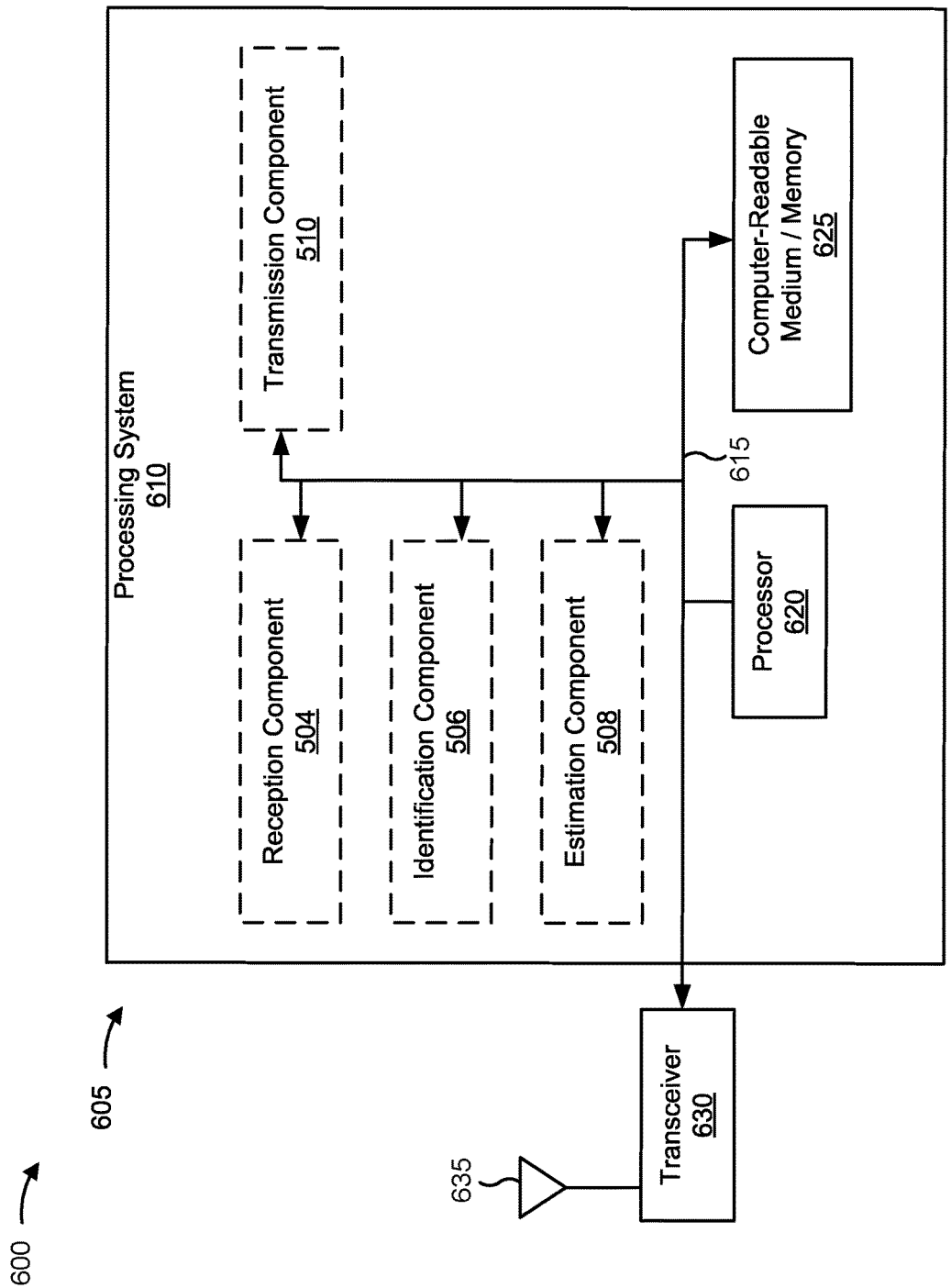
FIG. 6 is a diagram illustrating an example of a hardware implementation for an apparatus employing a processing system, in accordance with various aspects of the present disclosure.

FIG. 6 is a diagram 600 illustrating an example of a hardware implementation for an apparatus 605 employing a processing system 610. The apparatus 605 may be a UE.

The processing system 610 may be implemented with a bus architecture, represented generally by the bus 615. The bus 615 may include any number of interconnecting buses and bridges depending on the specific application of the processing system 610 and the overall design constraints. The bus 615 links together various circuits including one or more processors and/or hardware components, represented by the processor 620, the components 504, 506, 508, and/or 510, and the computer-readable medium/memory 625. The bus 615 may also link various other circuits such as timing sources, peripherals, voltage regulators, and power management circuits, which are well known in the art, and therefore will not be described any further.

The processing system 610 may be coupled to a transceiver 630. The transceiver 630 is coupled to one or more antennas 635. The transceiver 630 provides a means for communicating with various other apparatuses over a transmission medium. The transceiver 630 receives a signal from the one or more antennas 635, extracts information from the received signal, and provides the extracted information to the processing system 610, specifically the reception component 504. In addition, the transceiver 630 receives information from the processing system 610, specifically the transmission component 510, and based at least in part on the received information, generates a signal to be applied to the one or more antennas 635.

The processing system 610 includes a processor 620 coupled to a computer-readable medium/memory 625. The processor 620 is responsible for general processing, including the execution of software stored on the computer-readable medium/memory 625. The software, when executed by the processor 620, causes the processing system 610 to perform the various functions described herein for any particular apparatus. The computer-readable medium/memory 625 may also be used for storing data that is manipulated by the processor 620 when executing software. The processing system further includes at least one of the components 504, 506, 508, and/or 510. The components may be software modules running in the processor 620, resident/stored in the computer readable medium/memory 625, one or more hardware modules coupled to the processor 620, or some combination thereof.

In some aspects, the processing system 610 may be a component of the UE 120 and may include the memory 282 and/or at least one of the TX MIMO processor 266, the RX processor 258, and/or the controller/processor 280. In some aspects, the apparatus 605 for wireless communication includes means for identifying one or more pathloss reference signals based at least in part on whether a configuration, that indicates a set of pathloss reference signals, has been received and based at least in part on whether a pathloss reference signal activation command has been received; means for estimating pathloss using the one or more pathloss reference signals; and/or the like. Additionally, or alternatively, the apparatus 605 for wireless communication may include means for identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; means for estimating pathloss using the one or more pathloss reference signals; and/or the like. The aforementioned means may be one or more of the aforementioned components of the apparatus 502 and/or the processing system 610 of the apparatus 605 configured to perform the functions recited by the aforementioned means. As described elsewhere herein, the processing system 610 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 6 is provided as an example. Other examples may differ from what is described in connection with FIG. 6.

The following provides an overview of some aspects of the present disclosure:

Aspect 1: A method of wireless communication performed by a user equipment (UE), comprising: identifying one or more pathloss reference signals based at least in part on whether a configuration, that indicates a set of pathloss reference signals, has been received and based at least in part on whether a pathloss reference signal activation command has been received; and estimating pathloss using the one or more pathloss reference signals.

Aspect 2: The method of aspect 1, wherein the one or more pathloss reference signals are identified based at least in part on at least one of: whether pathloss reference signal activation commands are enabled, a number of configured pathloss reference signals, whether the number of configured pathloss reference signals satisfies a threshold, or a combination thereof.

Aspect 3: The method of aspect 2, wherein the one or more pathloss reference signals are identified based at least in part on a determination that pathloss reference signal activation commands are enabled and the number of configured pathloss reference signals satisfies a threshold.

Aspect 4: The method of aspect 2, wherein the one or more pathloss reference signals are identified based at least in part on a determination that pathloss reference signal activation commands are enabled and the number of configured pathloss reference signals does not satisfy a threshold.

Aspect 5: The method of aspect 2, wherein the one or more pathloss reference signals are identified based at least in part on a determination that pathloss reference signal activation commands are disabled and the number of configured pathloss reference signals satisfies a threshold.

Aspect 6: The method of aspect 2, wherein the one or more pathloss reference signals are identified based at least in part on a determination that pathloss reference signal activation commands are disabled and the number of configured pathloss reference signals does not satisfy a threshold.

Aspect 7: The method of any one of aspects 2-6, wherein the pathloss reference signal activation commands are medium access control (MAC) control element (CE) commands.

Aspect 8: The method of any one of the preceding aspects, wherein the one or more pathloss reference signals are identified based at least in part on a determination that the configuration has been received and based at least in part on a determination that the pathloss reference signal activation command has been received.

Aspect 9: The method of aspect 8, wherein the one or more pathloss reference signals are indicated in the pathloss reference signal activation command.

Aspect 10: The method of aspect 8, wherein the one or more pathloss reference signals include the set of pathloss reference signals indicated in the configuration or a subset of the set of pathloss reference signals indicated in the configuration.

Aspect 11: The method of any one of aspects 1-7, wherein the one or more pathloss reference signals are identified based at least in part on a determination that the configuration has been received and based at least in part on a determination that the pathloss reference signal activation command has not been received.

Aspect 12: The method of aspect 11, wherein the one or more pathloss reference signals include a synchronization signal block used to obtain a master information block.

Aspect 13: The method of aspect 11, wherein the one or more pathloss reference signals include a subset of the set of pathloss reference signals.

Aspect 14: The method of aspect 13, wherein the subset is identified based at least in part on a rule.

Aspect 15: The method of any one of aspects 13-14, wherein the subset includes a specific number of pathloss reference signals.

Aspect 16: The method of any one of aspects 13-15, wherein the subset includes one of: a subset of pathloss reference signals, included in the set of pathloss reference signals, having highest reference signal identifiers among the set of pathloss reference signals; a subset of pathloss reference signals, included in the set of pathloss reference signals, having lowest reference signal identifiers among the set of pathloss reference signals; a subset of pathloss reference signals, included in the set of pathloss reference signals, having highest reference signal identifiers, in a serving cell, among the set of pathloss reference signals; a subset of pathloss reference signals, included in the set of pathloss reference signals, having lowest reference signal identifiers, in the serving cell, among the set of pathloss reference signals; a subset of pathloss reference signals, included in the set of pathloss reference signals, having highest reference signal identifiers, in an active bandwidth part of the serving cell, among the set of pathloss reference signals; or a subset of pathloss reference signals, included in the set of pathloss reference signals, having lowest reference signal identifiers, in an active bandwidth part of the serving cell, among the set of pathloss reference signals.

Aspect 17: The method of aspect 11, wherein the one or more pathloss reference signals are indicated by a base station or are specified by a wireless communication standard.

Aspect 18: The method of aspect 17, wherein the one or more pathloss reference signals are not included in the set of pathloss reference signals.

Aspect 19: The method of aspect 11, wherein the one or more pathloss reference signals include a subset of pathloss reference signals, of the set of pathloss reference signals, that is indicated in the configuration.

Aspect 20: The method of aspect 19, wherein the subset of pathloss reference signals includes at least one of: a pathloss reference signal indicated in association with a physical uplink shared channel power control configuration, a pathloss reference signal indicated in association with an activated physical uplink control channel spatial relation, a pathloss reference signal indicated in association with a sounding reference signal resource set, or a combination thereof.

Aspect 21: The method of any one of aspects 19-20, wherein a number of pathloss reference signals, included in the subset of pathloss reference signals, is less than or equal to a threshold.

Aspect 22: The method of any one of aspects 1-7, wherein the one or more pathloss reference signals are identified based at least in part on a determination that the configuration has not been received and based at least in part on a determination that the pathloss reference signal activation command has not been received.

Aspect 23: The method of aspect 22, wherein the one or more pathloss reference signals include a synchronization signal block used to obtain a master information block.

Aspect 24: The method of aspect 22, wherein the one or more pathloss reference signals are indicated by a base station or are specified by a wireless communication standard.

Aspect 25: The method of any one of the preceding aspects, wherein the one or more pathloss reference signals are identified for a particular uplink channel or a particular uplink reference signal.

Aspect 26: The method of any one of the preceding aspects, wherein different uplink channels or different uplink reference signals are associated with at least one of: different configurations that indicate corresponding sets of pathloss reference signals for a corresponding uplink channel or uplink reference signal, different pathloss reference signal activation commands, or a combination thereof.

Aspect 27: The method of any one of the preceding aspects, wherein the configuration and the pathloss reference signal activation command are specific to an uplink channel, an uplink reference signal, a group of uplink channels, a group of uplink reference signals, or a group that includes at least one uplink channel and at least one uplink reference signal.

Aspect 28: The method of any one of the preceding aspects, wherein the one or more pathloss reference signals are identified for all uplink channels and all uplink reference signals.

Aspect 29: The method of any one of the preceding aspects, wherein a number of pathloss reference signals, included in the set of pathloss reference signals, is based at least in part on whether pathloss reference signal activation commands are enabled or disabled.

Aspect 30: The method of aspect 29, wherein the number of pathloss reference signals is permitted to be greater than a threshold if pathloss reference signal activation commands are enabled, and is not permitted to be greater than the threshold if pathloss reference signal activation commands are disabled.

Aspect 31: The method of any one of the preceding aspects, wherein the configuration is included in a radio resource control message.

Aspect 32: The method of any one of the preceding aspects, wherein the pathloss reference signal activation command is a medium access control (MAC) control element (CE) message.

Aspect 33: The method of any one of the preceding aspects, wherein the set of pathloss reference signals includes at least one channel state information reference signal.

Aspect 34: The method of any one of the preceding aspects wherein the one or more pathloss reference signals comprise one or more default pathloss reference signals.

Aspect 35: A method of wireless communication performed by a user equipment (UE), comprising: identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled; and estimating pathloss using the one or more pathloss reference signals.

Aspect 36: The method of aspect 34, wherein the number of pathloss reference signals is permitted to be greater than a threshold if pathloss reference signal activation commands are enabled, and is not permitted to be greater than the threshold if pathloss reference signal activation commands are disabled.

Aspect 37: An apparatus for wireless communication at a device, comprising a processor; memory coupled with the processor; and instructions stored in the memory and executable by the processor to cause the apparatus to perform the method of one or more aspects of aspects 1-34.

Aspect 38: A device for wireless communication, comprising a memory and one or more processors coupled to the memory, the memory and the one or more processors configured to perform the method of one or more aspects of aspects 1-34.

Aspect 39: An apparatus for wireless communication, comprising at least one means for performing the method of one or more aspects of aspects 1-34.

Aspect 40: A non-transitory computer-readable medium storing code for wireless communication, the code comprising instructions executable by a processor to perform the method of one or more aspects of aspects 1-34.

Aspect 41: A non-transitory computer-readable medium storing a set of instructions for wireless communication, the set of instructions comprising one or more instructions that, when executed by one or more processors of a device, cause the device to perform the method of one or more aspects of aspects 1-34.

Aspect 42: An apparatus for wireless communication at a device, comprising a processor; memory coupled with the processor; and instructions stored in the memory and executable by the processor to cause the apparatus to perform the method of one or more aspects of aspects 35-36.

Aspect 43: A device for wireless communication, comprising a memory and one or more processors coupled to the memory, the memory and the one or more processors configured to perform the method of one or more aspects of aspects 35-36.

Aspect 44: An apparatus for wireless communication, comprising at least one means for performing the method of one or more aspects of aspects 35-36.

Aspect 45: A non-transitory computer-readable medium storing code for wireless communication, the code comprising instructions executable by a processor to perform the method of one or more aspects of aspects 35-36.

Aspect 46: A non-transitory computer-readable medium storing a set of instructions for wireless communication, the set of instructions comprising one or more instructions that, when executed by one or more processors of a device, cause the device to perform the method of one or more aspects of aspects 35-36.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying one or more pathloss reference signals based at least in part on whether a configuration, that indicates a set of pathloss reference signals, has been received and based at least in part on whether a pathloss reference signal activation command has been received,
        wherein a number of pathloss reference signals, included in the set of pathloss reference signals, is permitted to be greater than a threshold if pathloss reference signal activation commands are enabled, and is not permitted to be greater than the threshold if pathloss reference signal activation commands are disabled; and
    estimating pathloss using the one or more pathloss reference signals.

2. The method of claim 1, wherein the one or more pathloss reference signals are identified based at least in part on a determination that the configuration has not been received and based at least in part on a determination that the pathloss reference signal activation command has not been received.

3. The method of claim 2, wherein the one or more pathloss reference signals include a synchronization signal block used to obtain a master information block.

4. The method of claim 1, wherein the one or more pathloss reference signals are identified for a particular uplink channel or a particular uplink reference signal.

5. The method of claim 1, wherein the pathloss reference signal activation command is a medium access control (MAC) control element (CE) message.

6. The method of claim 1, wherein the set of pathloss reference signals includes at least one channel state information reference signal.

7. The method of claim 1, wherein the one or more pathloss reference signals comprise one or more default pathloss reference signals.

8. The method of claim 1, wherein the one or more pathloss reference signals are identified based at least in part on at least one of:
    whether pathloss reference signal activation commands are enabled,
    a number of configured pathloss reference signals,
    whether the number of configured pathloss reference signals satisfies a threshold, or a combination thereof.

9. The method of claim 1, wherein the one or more pathloss reference signals are identified based at least in part on a determination that the configuration has been received and based at least in part on a determination that the pathloss reference signal activation command has been received.

10. The method of claim 1, wherein the one or more pathloss reference signals are identified based at least in part on a determination that the configuration has been received and based at least in part on a determination that the pathloss reference signal activation command has not been received.

11. The method of claim 1, wherein the configuration and the pathloss reference signal activation command are specific to an uplink channel, an uplink reference signal, a group of uplink channels, a group of uplink reference signals, or a group that includes at least one uplink channel and at least one uplink reference signal.

12. A method of wireless communication performed by a user equipment (UE), comprising:
    identifying one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled,
        wherein the number of pathloss reference signals is permitted to be greater than a threshold if pathloss reference signal activation commands are enabled, and is not permitted to be greater than the threshold if pathloss reference signal activation commands are disabled; and
    estimating pathloss using the one or more pathloss reference signals.

13. The method of claim 12, wherein the one or more pathloss reference signals are identified based at least in part on a determination that the configuration has been received and based at least in part on a determination that a pathloss reference signal activation command has been received.

14. The method of claim 12, wherein the one or more pathloss reference signals are identified based at least in part on a determination that the configuration has been received and based at least in part on a determination that a pathloss reference signal activation command has not been received.

15. The method of claim 12, wherein the one or more pathloss reference signals are identified for a particular uplink channel or a particular uplink reference signal.

16. A user equipment (UE) for wireless communication, comprising:
a memory; and
one or more processors coupled to the memory, the one or more processors configured to:
identify one or more pathloss reference signals based at least in part on whether a configuration, that indicates a set of pathloss reference signals, has been received and based at least in part on whether a pathloss reference signal activation command has been received,
wherein a number of pathloss reference signals, included in the set of pathloss reference signals, is permitted to be greater than a threshold if pathloss reference signal activation commands are enabled, and is not permitted to be greater than the threshold if pathloss reference signal activation commands are disabled; and
estimate pathloss using the one or more pathloss reference signals.

17. The UE of claim 16, wherein the one or more pathloss reference signals are identified based at least in part on a determination that the configuration has not been received and based at least in part on a determination that the pathloss reference signal activation command has not been received.

18. The UE of claim 17, wherein the one or more pathloss reference signals include a synchronization signal block used to obtain a master information block.

19. The UE of claim 16, wherein the one or more pathloss reference signals are identified for a particular uplink channel or a particular uplink reference signal.

20. The UE of claim 16, wherein the pathloss reference signal activation command is a medium access control (MAC) control element (CE) message.

21. The UE of claim 16, wherein the set of pathloss reference signals includes at least one channel state information reference signal.

22. The UE of claim 16, wherein the one or more pathloss reference signals comprise one or more default pathloss reference signals.

23. The UE of claim 16, wherein the one or more pathloss reference signals are identified based at least in part on at least one of:
whether pathloss reference signal activation commands are enabled,
a number of configured pathloss reference signals,
whether the number of configured pathloss reference signals satisfies a threshold, or
a combination thereof.

24. The UE of claim 16, wherein the one or more pathloss reference signals are identified based at least in part on a determination that the configuration has been received and based at least in part on a determination that the pathloss reference signal activation command has been received.

25. The UE of claim 16, wherein the one or more pathloss reference signals are identified based at least in part on a determination that the configuration has been received and based at least in part on a determination that the pathloss reference signal activation command has not been received.

26. The UE of claim 16, wherein the configuration and the pathloss reference signal activation command are specific to an uplink channel, an uplink reference signal, a group of uplink channels, a group of uplink reference signals, or a group that includes at least one uplink channel and at least one uplink reference signal.

27. A user equipment (UE) for wireless communication, comprising:
a memory; and
one or more processors coupled to the memory, the one or more processors configured to:
identify one or more pathloss reference signals based at least in part on a configuration that indicates a set of pathloss reference signals, wherein a number of pathloss reference signals, included in the set of pathloss reference signals, is based at least in part on whether pathloss reference signal activation commands are enabled or disabled,
wherein the number of pathloss reference signals is permitted to be greater than a threshold if pathloss reference signal activation commands are enabled, and is not permitted to be greater than the threshold if pathloss reference signal activation commands are disabled; and
estimate pathloss using the one or more pathloss reference signals.

28. The UE of claim 27, wherein the one or more pathloss reference signals are identified based at least in part on a determination that the configuration has not been received and based at least in part on a determination that a pathloss reference signal activation command has been received.

29. The UE of claim 27, wherein the one or more pathloss reference signals are identified based at least in part on a determination that the configuration has not been received and based at least in part on a determination that a pathloss reference signal activation command has not been received.

30. The UE of claim 27, wherein the one or more pathloss reference signals are identified for a particular uplink channel or a particular uplink reference signal.

* * * * *